United States Patent [19]

Cornelison et al.

[11] Patent Number: 4,829,655
[45] Date of Patent: May 16, 1989

[54] CATALYST SUPPORT AND METHOD FOR MAKING SAME

[75] Inventors: Richard C. Cornelison, Hiram, Ohio; William B. Retallick, West Chester, Pa.

[73] Assignee: W. R. Grace & Co.-Conn., New York, N.Y.

[21] Appl. No.: 29,661

[22] Filed: Mar. 24, 1987

[51] Int. Cl.$^4$ .............................................. B01J 37/00
[52] U.S. Cl. ................................. 29/527.4; 29/527.2
[58] Field of Search ............ 29/527.4, 527.2, DIG. 32

[56] References Cited

U.S. PATENT DOCUMENTS

| | | | |
|---|---|---|---|
| 1,636,685 | 7/1927 | Downs . | |
| 3,059,326 | 10/1962 | Jominy | 29/196.2 |
| 3,305,323 | 2/1967 | Smith | 29/180 |
| 3,338,733 | 8/1967 | Rowady | 117/50 |
| 3,362,783 | 1/1968 | Leak | 23/2 |
| 3,437,605 | 4/1969 | Keith | 252/463 |
| 3,712,856 | 1/1973 | Betz | 204/29 |
| 3,867,313 | 2/1975 | Brewer | 252/465 |
| 3,873,472 | 3/1975 | Oshima | 252/466 B |
| 3,907,611 | 9/1975 | Sasame | 148/6.3 |
| 3,907,708 | 9/1975 | Lacroix | 252/439 |
| 3,925,579 | 12/1975 | Flinchum | 427/320 |
| 3,994,831 | 11/1976 | Betz | 252/458 |
| 4,056,489 | 11/1977 | Hindin | 252/462 |
| 4,077,913 | 3/1978 | Acres | 252/462 |
| 4,079,157 | 3/1978 | Yagi | 427/380 |
| 4,162,993 | 7/1979 | Retallick | 252/477 R |
| 4,179,412 | 12/1979 | Inaba | 252/472 |
| 4,188,309 | 2/1980 | Völker | 252/466 |
| 4,190,559 | 2/1980 | Retallick | 252/477 R |
| 4,247,422 | 1/1981 | Davies | 252/465 |
| 4,277,374 | 7/1981 | Lula | 252/446 |
| 4,301,039 | 11/1981 | Retallick | 252/477 R |
| 4,331,631 | 5/1982 | Chapman | 422/180 |
| 4,350,617 | 9/1982 | Retallick | 252/477 R |
| 4,425,305 | 1/1984 | Retallick | 422/180 |
| 4,601,999 | 7/1986 | Retallick | 502/314 |
| 4,673,553 | 6/1987 | Retallick | 422/180 |
| 4,686,155 | 8/1987 | Kilbane | 428/653 |
| 4,711,009 | 12/1987 | Cornelison | 29/157 R |

FOREIGN PATENT DOCUMENTS 49-99982 9/1974 Japan .
1368333 9/1974 United Kingdom .

OTHER PUBLICATIONS

SAE Paper No. 770299, "Metal Supported Catalysts for Automotive Applications".

Primary Examiner—Mark Rosenbaum
Assistant Examiner—Taylor J. Ross
Attorney, Agent, or Firm—Steven T. Trinker

[57] ABSTRACT

This invention relates to catalyst supports, such as are used in catalytic converters for vehicles, and in other applications, such as diesel particulate traps. The invention discloses a novel composition for a catalyst support, and a method of making it. The support includes a base material, such as a stainless steel. If the base material is a metal, it can be rolled down to the thickness of a foil and then coated with a layer of aluminum. The coating is done by a vapor deposition technique, so that the aluminum coating is thin and substantially uniform. The base material can be almost any substance capable of withstanding the high temperatures expected in the catalytic converter or other application. Because the material is already of foil thickness when it is coated, it is not necessary to select a material which is capable of being rolled down after being coated with aluminum. Thus, the invention makes it possible to use a much wider variety of materials than have been used in the prior art.

11 Claims, No Drawings

CATALYST SUPPORT AND METHOD FOR MAKING SAME

BACKGROUND OF THE INVENTION

Since at least 1970, much effort has been expended to develop durable catalyst supports, for use in catalytic converters, which supports can be mass produced and which achieve long converter life. In recent years, metal supports have gained favor because they can be fabricated in any shape or size and the converter is about 20% smaller than the equivalent ceramic converter. When temperatures exceed 2000° F., metal converters do not melt down and plug the exhaust flow, as do ceramic converters. Furthermore, the metal supports used in honeycomb cores have approximately 90% open area, whereas ceramic cores have thicker cell walls and typically have approximately 70% open area, which generates a higher pressure drop.

Anticipated future applications will require materials that will withstand cyclic oxidation in exhaust environments in the range of 2300° F. Such future applications include recuperators for gas turbines, planned for automobiles in the late-1990s, catalytic combustors for gas turbines, and converters for spark-ignited internal combustion engines in which the converter is coupled directly to the cylinder head.

Another example of the need for materials which can function at high temperatures is in the area of diesel particulate traps, where the temperature can reach 2400° F. during regeneration, i.e. when carbon particles are burned off.

In addition to the need for supports which withstand high temperatures, there is a need for supports that can withstand oxidation from residual sulfur compounds found in many liquid fuels. Sulfur accelerates oxidation, and causes failure of the support, under hot cyclic conditions.

The prior art that relates to metal supports for catalytic converters culminates in U.S. Pat. No. 4,601,999 which describes a composition for a catalyst support, made by the hot-dip coating process for coating aluminum on ferritic stainless steel strip, which is subsequently rolled to foil. This composition is relatively resistant to hot cyclic corrosion, and it does not interact with the catalyst coating.

Another invention that describes the process for making an aluminium-coated base metal foil, for use as a catalyst support, is disclosed in U.S. Pat. No. 4,686,155, entitled "Oxidation Resistant Ferrous Base Foil and Method Therefore", which is also based on hot-dip coated aluminum on stainless steel.

Methods for making a metal strip into a finished catalytic converter are given in U.S. Pat. No. 4,576,800, "Catalytic Converter for an Automobile" and in U.S. Pat. No. 4,673,553, "Metal Honeycomb Catalyst Support Having a Double Taper". The metal strip is corrugated so that when it is wound into a spiral or folded back and forth upon itself, the corrugations form channels for the flow of gas. Before the strip is wound or folded it is coated with catalytic materials or heat resistant materials, depending on the application.

U.S. Pat. No. 4,711,009, "Process and Apparatus for Making Metal Substrate Catalytic Converters", describes a continuous process for producing converters made with a metal catalyst support.

Both U.S. Pat. No. 4,601,999 and U.S. Pat. No. 4,686,155 contemplate a hot-dipped aluminum coating on a ferritic stainless steel strip at least 0.020 inch thick followed by reduction to foil thickness by rolling the coated strip. This process has a number of disadvantages, which are outlined below. Also noted below are the means by which the present invention overcomes the limitations of the prior art.

1. The hot-dip process sometimes leaves the coated foil with an uneven aluminum coating along its length and across its width. Indeed, the thickness of the coating can be as low as zero, and as high as 400 microinches or more, on the same coil of 0.0025 inch thick foil. The variations in thickness occur in spots or streaks where the aluminum does not cover the underlying steel.

One of the causes for the variation in thickness is that the aluminumis softer than the steel. Because the thickness of the steel varies, the softer aluminum becomes the repository of the initial non-uniformity of both the stainless steel and the aluminum coating. Another cause of a non-uniform aluminum coating is hard spots in the stainless steel, or inclusions, such as lumps of oxide, or the like, that do not roll to foil as readily as the balance of the steel.

In the present invention, the steel is first rolled to foil thickness and then is coated with aluminum by vapor deposition. Hot-dip coating of the foil is not practical because the thin foil would dissolve, at least partly, in the aluminum. The vapor-deposited coating is uniform, even if the surface of the base metal is uneven. This uniformity is analogous to that of a snowfall, which uniformly coats both smooth and rough pavement.

2. In the the hot-dip process no more than 3% aluminum and 1% silicon can be included in the base metal. Otherwise, the base metal is not wetted by molten aluminum. This limitation of the prior art eliminates many high temperature base metals from consideration. According to the present invention, the base metals to be coated need only be (a) thin and in roll-form, (b) reasonably smooth, and (c) able to be heat treated to 1200°–1400° F. to form an aluminum oxide film on the surface. Many base metals, besides ferritic stainless steel, can be used, such as austenitic stainless steel, martensitic stainless steel, superalloys, titanium, and composite materials including composites of metals and ceramics.

3. In the prior art, wherein the hot-dip coating process is used, the foil is work hardened by the many passes through a rolling mill. Intermediate annealing between rolling mill passes is not practical because the aluminum coating would develop an oxide film which is hard and abrasive and unsuitable for rerolling. When the base metal is first rolled to foil thickness and then coated with aluminum, the foil can be bright annealed (in a non-oxidizing atmosphere) before coating it with aluminum. This is important because high performance alloys can be made relatively ductile by a final annealing after they have been rolled to foil thickness.

4. In the hot-dip coating process of the prior art, annealing the aluminum-coated foil before corrugating would oxidize the aluminum coating. The aluminum oxide thus formed would crack and also would abrade the corrugating rolls. The cracks expose the underlayers of the support and thereby open sites of potential corrosion. When the foil is annealed before it is coated with aluminum, the foil is corrugated in a ductile state so that a minimum of stress centers are created in the catalyst support. Further, the aluminum surface does not abrade the corrugating rolls, but instead it serves as a lubricant.

5. In the hot-dip coating process, the thick aluminum-coated steel strip undergoes as many as 10 passes through a rolling mill. During the rolling, the rolls embed in the soft aluminum any dirt that has accumulated on the surface of the rolls. In the finished foil, this embedded dirt becomes the source of corrosion sites, just as do the stress centers mentioned earlier. Oil used in rolling is hard to remove and, if heated, tends to leave a film which lessens the adherence of the catalyst coating.

6. In the hot-dip coating process, the molten aluminum dissolves iron from the strip that is being coated. The amount of iron that is typically alloyed with the molten aluminum is 2–4%, by weight, which subsequently becomes part of the aluminum coating on the same strip. In the end product foil, this results in impurities, which reduce the corrosion resistance. Also, the iron-aluminum coating is less ductile than a pure aluminum coating and is less suitable for corrugating. In the present invention the aluminum used to coat the surfaces of the catalyst support contains no unwanted alloys or impurity.

7. According to the present invention, the base material is not limited to metals, but can include ceramics, high-temperature composite materials comprised of metals, ceramics, silicates, nitrides, borides, and refractory-metal oxides, or a combination, any of which can be coated with aluminum, heated to a temperature high enough to form an aluminum oxide coating (nominally 1400° F.), and subsequently processed to make an end product that heretofore was limited to use of metal alone.

The following is a list of references dealing with the field of the present application. These items, and the patents and patent applications cited above, are incorporated by reference herein:

Oxidation of Metals & Alloys, Butterworths, by Dr. O. Kubaschewski and B. E. Hopkins, 1962.

Handbook On Thin Film Technology, McGraw Hill, Edited by L. I. Maissel & R. G. Lang, 1970.

Source Book On Materials For Elevated-Temperature Applications, American Society for Metals, by E. F. Bradley, 1975.

High-Temperature Protective Coatings, Conference Proceedings, The Metallurgical Society of AIME, Edited by Subhash C. Singhal, 1983

Ferritic Steels for High-Temperature Applications, American Society for Metals, Edited by Ashok K. Khare, 1983

Vapor Deposition, The Electrochemical Society, Inc., Edited by C. F. Powell, J. H. Oxley and J. M. Blocher, Jr., 1983

High Temperature Alloys: Theory and Design, The Metallurgical Society of AIME, Edited by J. O. Stiegler, 1984

High-Temperature Ordered Intermetallic Alloys, Materials Research Society, C. C. Koch, C. T. Liu, N. S. Stoloff, 1984

Thin Films: The Relationship of Structure to Properties, Materials Research Society, Editors Carolyn Rubin Aita and K. S. SreeHarsha, 1985

Engineers' Guide to Composite Materials, American Society for Metals, Edited by John W. Weeton, 1987

SUMMARY OF THE INVENTION

This invention provides a new series of compositions for use as catalyst supports, and a method of making such compositions. The compositions of the invention are useful as honeycomb cores for catalytic converters in automobiles, but can also be used in other contexts. The composition of the invention includes a base material which can be metal or ceramic. The composition can also be a composite material comprising one or more of metal, ceramics, silicates, nitrides, borides, graphite and refractory-metal oxides.

According to the invention, the base material is coated with a thinlayer of aluminum, of substantially uniform thickness, by a process of vapor deposition. A stabilizer, selected from the group consisting of zirconium, yttrium, hafnium, and the rare earth metals, may be added to the aluminum. The vapor deposition technique produces a uniform coating, regardless of the roughness of the base material. Because aluminum vapor can be deposited on a metal of virtually any thickness, it is feasible to roll a base metal to the thickness of a foil before applying the aluminum coating.

Thus, a major advantage of the invention is the elimination of the requirement that the base material be chosen from those materials to which molten aluminum will adhere, or to those materials which can be easily rolled to foil after being coated. The base material need only be a material capable of withstanding the temperatures expected during operation of the catalytic converter or other device.

The present invention is especially useful in making aluminum-coated metal foils for catalytic converters for automobiles. But the invention has uses beyond catalytic converters. The same surface that binds a catalytic coating to it will also bind to itself a heat-resistant coating. Thus, the new composition can be used as cores in products such as diesel traps or recuperators that operate at high temperatures. It can also be used as a catalyst display surface for chemical processes.

It is therefore an object of this invention to provide a new series of compositions for use as catalyst supports.

It is another object to provide a catalyst support that can survive in very high temperatures in corrosive atmospheres.

It is another object to provide a catalyst support in the form of a foil or thin film.

It is another object to provide a catalyst support for use in catalytic convertres for automobiles.

It is another object to provide a catalyst support for making high temperature cores for diesel traps, recuperators and similar products.

It is another object to provide a method of making a catalyst support.

It is another object to expand the number of materials which can be used in making catalyst supports, and thereby to reduce the expense of such supports.

Other objects and advantages of the invention will be apparent to those skilled in the art, from a reading of the following detailed description of the invention and the appended claims.

DETAILED DESCRIPTION OF THE INVENTION

The preferred embodiment of the invention comprises a metal strip that is made or processed to a thickness of 0.001 to 0.010 inches and then is coated with aluminum or an aluminum alloy. A relatively thick strip can be passed through a rolling mill and rolled to gauge to provide the base material.

There are various methods for forming a metal foil that is to be coated with aluminum. These include the following:

1. A thick strip of metal can be rolled to foil thickness as described above.

2. A curtain of molten metal can be made to impinge on a cooled roller that rotates at high speed. The metal solidifies on the cold surface of the roller to form the foil. The time for solidification is only about one millisecond, and the rate of cooling is about one million degrees centigrade per second. The foil can be as thin as 0.001 inch. The foil is continuously peeled off the cooled roller and is wound into coils. At such high rates of cooling, the metal is amorphous, instead of crystalline, as it would be at slower cooling rates. This method was pioneered for making cores for electric power transformers. Now, it is being used to form foils from alloys that cannot be made by conventional slow cooling.

3. The cooled roller need not have a smooth surface, but instead the surface can be corrugated. This produces a foil that is already corrugated.

The surface of the foil produced by any of these methods can be given increased corrosion resistance by implanting a thin coating of, for example, TiN, TiC, ZrN, CrN, and $Al_2O_3$. The thickness of this coating is only a few micrometers, which is thinner than the aluminum coating to be applied later. One method of implanting these coatings is by the cathodic arc method. To form a coating of TiN, titanium ions are formed at the cathode in low-pressure nitrogen. The titanium ions react with the nitrogen to form the nitride, still ionized, which implants itself in the surface of the catalyst support. Such coatings have been applied to cutting tools and to blades for gas turbines. These coatings are not wetted by molten aluminum, but they can be coatd with aluminum by vapor deposition, according to the invention. In addition to metal foils, other materials that can be coated with aluminum by vapor deposition include screens woven from fibers of metal or ceramic, or both.

Vapor deposition can be done by various means, such as are described in the following examples:

1. A tungsten filament is heated with an electric current, and the heat is radiated into a pool of molten aluminum. This is called thermal vaporization.

2. The pool of aluminum is heated by electrical induction or with an electron beam. This is another example of thermal vaporization.

3. In the process called sputtering, the bulk of the aluminum to be vaporized is not heated, but instead an electric arc is struck from the surface of the aluminum. The arc moves rapidly over the surface of the aluminum, and the spot being heated at any instant is tiny, only a few micrometers in diameter. Metal is evolved from the surface as metal ions, in contrast to thermal vaporization, where the metal is evolved as uncharged atoms. Sputtering occurs at low vacuum, so that the mean free path of the metal ions is restricted by collisions with the gas molecules. The metal ions do not travel in straight lines to the target that is being coated. Because of this fact, sputtering is a preferred method for coating a rough surface. Thermal vaporization occurs at high vacuum and the metal atoms travel to the target along straight lines.

4. In chemical vapor coating, a compound of the coating metal is decomposed on the surface of the target. This process is not preferred in the present invention because there are no compounds of aluminum that readily decompose to the metal.

All embodiments of the invention comprise coating a thin strip with aluminum by vapor deposition. There are some compositions of aluminum-coated metal foil that can be made by this invention, but which cannot be made by the hot-dip method of the prior art. These compositions comprise:

(1) Metals that cannot be rolled to foil thickness;
(2) Metals that are not wetted by molten aluminum; and
(3) Metals that cannot be rolled to foil thickness, and also are not wetted by molten aluminum.

As explained in U.S. Pat. No. 4,601,999, when the metal to be coated contains more than about 3% aluminum, or more than about 1% silicon, it is not readily wetted by molten aluminum, and it is also difficult to roll the metal down to foil thickness. Therefore, the metals used in the above-cited patent must be limited to alloys which do not exceed these limits.

Another example of a material which is not readily wetted by molten aluminum, and which is not readily rollable to foil, is the class of alloys called "superalloys". Superalloys are used for blades for gas turbines, where temperatures and stresses are increasing year by year. An example of a superalloy is Nimonic 115, and has the following composition:

|  | Weight (%) |
| --- | --- |
| Carbon | 0.15 |
| Chromium | 15.0 |
| Cobalt | 15.0 |
| Molybdenum | 3.5 |
| Aluminum | 5.0 |
| Titanium | 4.0 |
| Nickel | balance |

Such an alloy cannot be rolled to a foil thickness. A foil could be made by solidifying a curtain of the molten alloy on a coated roller, as just described. The foil so formed could be coated by vapor deposition.

The first step in making a catalyst support according to this invention is to select the base material that is to be coated with aluminum. Any of the metals disclosed in U.S. Pat. No. 4,601,999 can be used as a base material. As stated above, the primary criterion for selection of a material is its ability to withstand elevated temperatures. Thus, it is possible to use many other materials, besides those disclosed in the above-cited patent.

While the metals used in the above-cited patent are limited to the ferritic steels (having no significant amounts of nickel), the present invention is not so limited. Stainless steels that contain nickel as well as chromium can be made into catalyst supports by the method of this invention, but not by the hot-dip process of the prior art. The reason is that these steels work harden so rapidly that they must be annealed at least once during the rolling process. Annealing causes the aluminum to combine with the nickel to form a brittle crust that flakes off in the next pass through the rollers.

Nickel-bearing stainless steels can be rolled to foil thickness, with annealing, and then coated with aluminum by vapor deposition. These nickel-bearing stainless steels comprise the austenitic series. Typical compositions are:

| AISI NO. | % Chromium | % Nickel |
| --- | --- | --- |
| 202 | 17–19 | 4–6 |
| 304 | 18–20 | 8–10 |
| 314 | 23–26 | 19–22 |

These austenitic stainless steels have good oxidation resistance, and are promising candidates for catalyst supports, when coated with aluminum. But they must be rolled to foil thickness first and then coated with aluminum, by the method of this invention.

After the base material has been selected, the next step is to coat the material on both sides with a film of aluminum or an aluminum alloy. The preferred process is vapor deposition with thermal vaporization of the aluminum. The aluminum is vaporized continuously under high vacuum. The atoms of aluminum travel in straight lines to the target upon which they are deposited. The thickness of the coating is proportional to the time of exposure and to the rate of metal vaporization. The atoms of vaporized aluminum will travel to the target along straight lines only if they do not collide with residual gas molecules during their flight. There will be no collisions if the pressure of the residual gas is low enough, and this means pressures of about $10^{-5}$ Torr.

The aluminum to be vaporized is fed as a wire to the electrically-heated vaporizer. The wire is vaporized as fast as it is fed, so that the rate of feed determines the rate of vapor generation. The foil being coated is continuously unwound from one reel, and coated and rewound onto a take-up reel. Both reels are normally located inside the vacuum chamber.

The coating deposited by vapor deposition is uniform, even if the surface of the base material is uneven or has hard inclusions in it. The coating of the base material uniformly with aluminum is analogous to that of a snowfall, in which snow uniformly coats both smooth and rough pavement.

The surface to be coated with aluminum must be clean. In the case of coating a metal foil, the foil is cleaned in several steps. The first step is vapor degreasing the foil to remove residual oils from the process of cold rolling to foil thickness. The second step is to mechanically scrub the surface of the foil to remove solid particles, followed by a rinse. Cleanliness of the foil is essential for good coating adherence.

The thickness of the foil used to make a honeycomb is governed by the cell density, which is dictated by the mass transfer and flow considerations and the need for structural rigidity. The following table shows typical foil thicknesses relative to various cell densities of the honeycomb:

| Cells Per Square Inch | Foil Thickness, Inches |
| --- | --- |
| 20 | .010 |
| 40 | .005 |
| 80 | .005 |
| 160 | .005 |
| 320 | .0025 |
| 500 | .002 |

The use of aluminum, as an alloying element in base metals to improve their resistance to hot cyclic oxidation, is well established. By the present invention, ceramics, and composites of metal and ceramic, can also be coated with aluminum, as practiced in microelectronic circuitry. The suface coating of aluminum (a) diffuses into the base material when it is heated to about 1400° F. or more, thus anchoring itself to the base material, (b) forms an aluminum oxide surface, which is porous, so that it binds the catalyst coating or some other coating, and (c) serves as a corrosion inhibitor because aluminum oxide does not crack or spall at high temperatures in corrosive atmospheres.

The thickness of the aluminum coating is about 150 to 330 micro-inches with a preferred range of about 220 to 280 microinches. A base metal that contains no aluminum will be given a thicker coat than a base metal that already contains some aluminum. The weight of the aluminum in the starting base metal plus the weight of aluminum in the coating should be about 5–10%, and preferably about 6–8%, of the weight of the coated support.

A feature of the invention is the uniformity of the thickness of the coating. The standard deviation in the thickness is no more than about 10 microinches. Such uniformity is not obtained by the hot dip method of coating.

As described above, the base metal may be coated with a thin layer of TiN, TiC, ZrN, CrN, or $Al_2O_3$, to improve its corrosion resistance.

The base metal, whether or not previously coated as described above, is coated with aluminum, initially of 99.9% purity, alloyed with one or more rare earth metals such as cerium, or with yttrium, hafnium, or zirconium. The metal or metals selected from this group will be referred to as a "stabilizer", because it has the effect of stabilizing the coating chemically and structurally in thermal-cycling environments.

The stabilizer metals are selected such that the the sum of their percentages, by weight, in the aluminum coating, is less than about 1.0%.

U.S. Pat. No. 3,920,583 discloses that yttrium helps to anchor the surface coating of alumina. U.S. Pat. No. 4,277,374 discloses that hafnium can be substituted for yttrium, and is cheaper besides. In both of these patents, the alumina coating was formed from aluminum contained in the base metal core, there being no additional coating of aluminum on the surface. The yttrium or hafnium was also contained in the base metal core, and only that fraction of them that diffused to the surface would help anchor the alumina coating. By including the yttrium or hafnium in the aluminum coating instead of in the base metal core, one expects to obtain the same anchoring effect with less yttrium or hafnium.

The amount of yttrium or hafnium cited in these patents did not exceed about 2%. When the stabilizer is included in the coating, 1% should be sufficient.

The usefulness of stabilizers has been established in the reference literature. Stabilizers have been used successfully for coating aircraft cast parts to prevent degradation in hot cyclic corrosive atmospheres. A cycling temperature is destructive because the coefficients of thermal expansion of the base material and of the aluminum oxide coating are widely different, thus tending to open fissures.

The stabilizer metal need not be soluble in aluminum at room temperature. Thus, it need not be fed to the vaporizer already alloyed with aluminum, in a single wire. Instead, the stabilizer metal can be fed to its own vaporizer as a separate wire or powder.

After a flat foil has been coated with aluminum, it is corrugated with rollers, as described in U.S. Pat. No. 4,711,009, cited above. After being corrugated, the foil is heat treated. The heat treatment serves three functions: (a) to stress relieve the metal so that is holds its shape, and does not relax at the temperatures that it will encounter in use, (b) to oxidize the aluminum coating to form an aluminum oxide layer, and (c) to cause the aluminum to diffuse into and thereby anchor itself to the base material.

The temperature at which the metal is heat treated after it has been aluminum-coated and corrugated is as high as the maximum temperature the end-product will see in service. The metal must see this service temperature for at least 5 seconds before it is finally assembled into the end product. When the service temperature is uncertain, the following heat treat schedule is used:

| Temperature (°F.) | Holding Time at Temperature (Minutes) |
|---|---|
| 1400 | 1.0 |
| 1600 | 0.3 |
| 1800 | 0.1 |

These holding times are approximate and can be varied by about 10%.

If the foil was made by the rapid cooling of molten metal on a corrugated roller, the process is simplified. The foil is already annealed and corrugated, and is ready for coating with aluminum. After the coating step, the foil must be heat treated to oxidize the aluminum coating and form the porous surface that binds the catalyst coating. This heat treatment need not be sufficient to relieve stresses, so that the temperatures can be lower than those given previously.

The base material, thus coated with aluminum, and heat treated, is now ready to be coated with a catalyst. U.S. Pat. No. 4,711,009, cited above, describes a method for applying a catalytic coating to the support. However, the present invention contemplates the application of other coatings for various applications, including temperature resistant coatings consisting of commercially available products containing, for example, various silicates, and adsorbent coatings such as zeolites.

As described above, it is apparent that the invention can be modified in many ways. Many different materials can be coated by a vapor deposition technique. While the preferred embodiment of the invention employs metal as the base material, non-metallic materials can also be used. Other variations in the composition of the base metal, and in the composition of the aluminum coating, can be made. Such modifications are understood to be within the spirit and scope of the following claims.

What is claimed is:

1. A method of making a support for a catalyst, comprising the steps of:
    (a) selecting a base metal capable of withstanding the elevated temperatures at which the support is to be used,
    (b) rolling the base metal down to a foil having a thickness of about 0.001–0.010 inches, and
    (c) coating the foil with aluminum, by depositing aluminum, from a vapor, onto the foil.

2. The method of claim 1, wherein the foil coating step is preceded by the step of coating the base metal with a layer of material selected from the group consisting of titanium nitride (TiN), titanium carbide (TiC), zirconium nitride (ZrN), chromium nitride (CrN), and aluminum oxide $Al_2O_3$.

3. The method of claim 1, wherein the base metal is annealed while the rolling step is performed.

4. The method of claim 1, wherein the base metal contains about 17–26% chromium.

5. A method of making a metal catalyst support, comprising the steps of:
    (a) selecting a base metal having a chromium content of about 17–26% and a nickel content of about 4–22%, the remainder of the base metal being mostly iron,
    (b) rolling the base metal down to the thickness of a foil, and
    (c) coating the foil with aluminum by vapor deposition.

6. The method of claim 5, wherein the aluminum coating contains metals selected from the group consisting of yttrium, hafnium, zirconium, and the metals of the rare earth group of the periodic table, wherein the sum of the selected metals is less than about 1% of the coating.

7. The method of claim 5, wherein the foil coating step is preceded by the step of coating the base metal with a layer of material selected from the group consisting of titanium nitride (TiN), titanium carbide (TiC), zirconium nitride (ZrN), chromium nitride (CrN), and aluminum oxide $Al_2O_3$.

8. A method of making a support for a catalyst, comprising the steps of:
    (a) selecting a base metal capable of withstanding the elevated temperatures at which the support is to be used,
    (b) rolling the base metal down to a foil having a thickness of about 0.001–0.010 inches, and
    (c) coating the foil with aliminum,
wherein the coating step comprises depositing aluminum, from a vapor, onto the foil, and wherein the foil coating step is preceded by the step of coating the base metal with a layer of material selected from the group consisting of titanium nitride (TiN), titanium carbide (TiC), zirconium nitride (ZrN), chromium nitride (CrN), and aluminum oxide $Al_2O_3$.

9. A method of making a support for a catalyst, comprising the steps of:
    (a) selecting a base metal capable of withstanding the elevated temperatures at which the support is to be used,
    (b) providing the base metal in the form of a foil having a thickness of about 0.001–0.010 inches, and
    (c) coating the foil with aluminum, by vapor deposition.

10. The method of claim 9, wherein the coating step is performed such that the thickness of the coating is in the range of about 150–330 microinches.

11. The method of claim 9, wherein the coating step is performed such that the standard deviation of the thickness of the aluminum coating is no more than about 10 microinches.

* * * * *